United States Patent [19]
Fujita

[11] Patent Number: 4,826,342
[45] Date of Patent: May 2, 1989

[54] UNIVERSAL JOINT
[75] Inventor: Toshiharu Fujita, Ibaragi, Japan
[73] Assignee: Sanyu Co., Ltd., Osaka, Japan
[21] Appl. No.: 104,181
[22] Filed: Oct. 5, 1987
[30] Foreign Application Priority Data
   May 30, 1987 [JP] Japan ................ 61-135803
[51] Int. Cl.$^4$ ............................. F16D 3/00
[52] U.S. Cl. ................... 403/57; 403/74; 403/141; 464/134
[58] Field of Search ........... 403/57, 74, 141, 147; 464/134, 135

[56]        References Cited
       U.S. PATENT DOCUMENTS
   1,153,789  9/1915  Hopkins ............... 464/135 X
   3,045,455  7/1962  Potgieter ............. 464/134
   3,490,798  1/1970  Spyra ................. 403/74 X FOREIGN PATENT DOCUMENTS
   352691   5/1922  Fed. Rep. of Germany ...... 464/135
   42-14012 of 1967 Japan .
   709298   5/1954  United Kingdom ............ 464/135

Primary Examiner—Andrew V. Kundrat
Attorney, Agent, or Firm—Edwin E. Greigg

[57] ABSTRACT

A universal joint having first and second shaft members respectively including a pair of yoke portions and a ball member disposed between the first and second shaft members for movably interconnecting the same. The respective first and second shaft members are constituted by two separate half-elements together with forming the respective pair of yoke portions. Base seats respectively having a truncated cone shape are provided in mutually opposing faces of the yoke portions such that each virtual cone has a virtual vertex having an angle of substantially 90 degrees and at the same time the virtual vertexes of the cones are substantially in contact with each other, the base seats respectively defining arc faces in mutually opposing surfaces thereof. And, the arc faces respectively have a central axis in a direction transverse to the shaft members and are formed by a part of a peripheral face of a virtual cylinder having the same diameter as the ball member which is rotatably supported between these arc faces.

4 Claims, 6 Drawing Sheets

FIG.6a
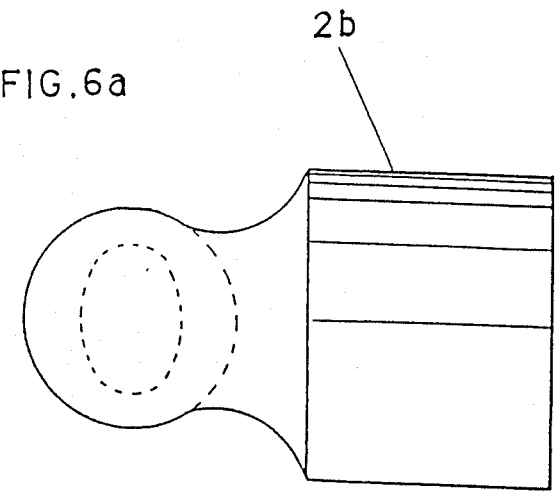
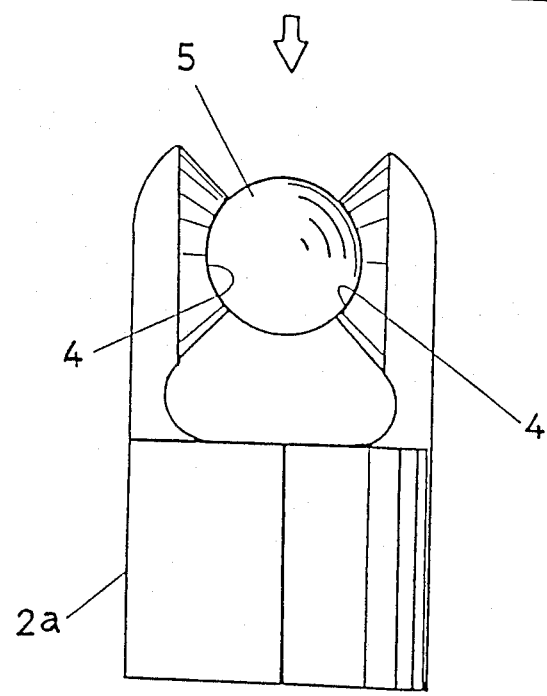
FIG.6b

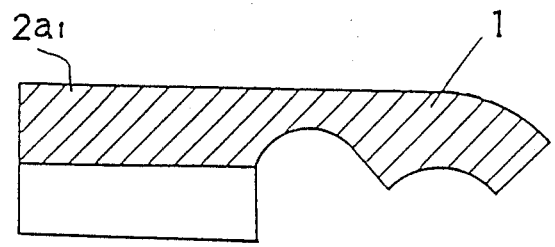
FIG. 7
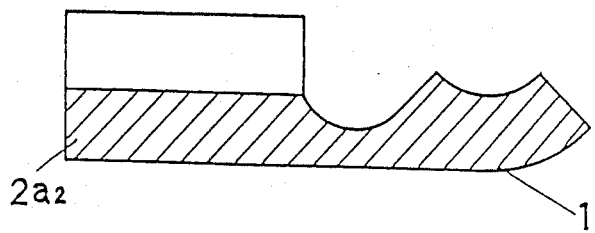
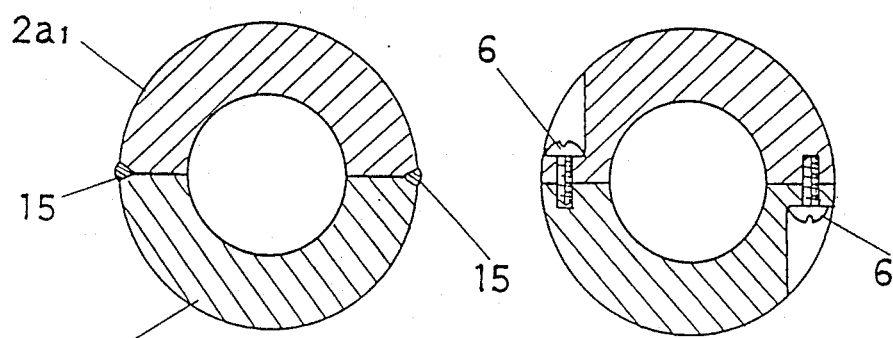
FIG. 8          FIG. 9
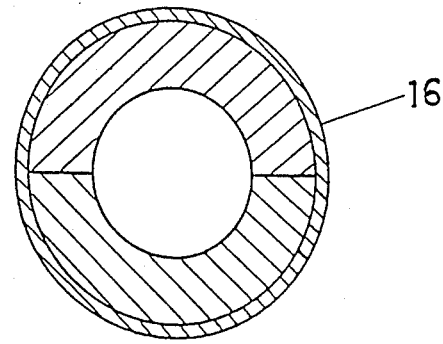
FIG. 10

UNIVERSAL JOINT

FIELD OF THE INVENTION

The present invention relates to a universal joint, and more particularly to a universal joint comprising two shaft members and a ball member interconnecting the shaft members.

DESCRIPTION OF THE PRIOR ART

Conventionally, a universal joint comprises a first shaft member, a second shaft member and a cross pin or a ball member interconnecting the first and second shaft members via yoke portions thereof. However, such conventional universal joints are invariably constituted by a considerably large number of elements and therefore troublesome to manufacture or assemble. Especially, for obtaining a high-quality universal joint, each member must be manufactured with a high precision and the assembly of thus-manufactured members is difficult. As the result, such high-quality universal joint tends to be costly.

Taking the above state of the art into consideration, the inventor heretofore suggested an improved universal joint published under a Japanese utility model application No. 51-59744. In the case of this universal joint; however, since ball receiving faces of the yoke portions are defined concavely along a spherical face of the ball member, the yoke portions need be stretched out in order to accommodate the ball member therein.

Because of this, if the yoke portions and the shaft members are formed integratedly with each other, these need be formed of a material having a sufficient elasticity. However, if plastic or the like is employed as the material for example, the universal joint formed as such may be applied for a low-torque condition but may not be applied for a high-torque condition. Therefore, in order to cope with such high-torque condition, as shown e.g. in FIG. 4 of the aforementioned publication, the yoke portions and the shaft portions were formed of metallic material independently of each other, and after accommodating the ball member in the yoke portions, the yoke portions and the shaft members were fixedly connected with each other by means of fixing means such as screws. Yet, there has been still room for improvement in the above construction and method in terms of assembly simplification and of cost reduction.

SUMMARY OF THE INVENTION

Therefore, it is a primary object of the present invention to provide a further improved universal joint which overcomes the above-described drawbacks of the prior art and which may be readily manufactured and assembled at a lower cost.

In order to accomplish the above object, a universal joint related to the present invention comprises first and second shaft members respectively including a pair of yoke portions and a ball member to be disposed between the first and second shaft members to movably interconnect the same. More particularly, this universal joint is characterized as follows: The respective first and second shaft members are constituted by two separate half-elements togetherwith forming the respective pair of yoke portions. In mutually opposing faces of the yoke portions, there are formed base seats respectively having a truncated cone shape such that each virtual cone has a virtual vertex having an angle of substantially 90 degrees and at the same time the virtual vertexes of the cones are substantially in contact with each other. Further, in mutually opposing surfaces of the base seats, there are formed arc faces respectively. Each of these arc faces has a central axis in a direction transverse to the shaft members and is formed by a part of a peripheral face of a virtual cylinder having the same diameter as the ball member which is rotatably supported between the arc faces.

Functions and effects of the above construction will be described next.

According to this construction, it is not at all necessary to use connecting means such as punching, calking, screws or the like for interconnecting the respective yoke portions of the first and second shaft members with the ball member, since the first and second shaft members may be readily connected and assembled by properly setting the engaging angle thereof. Further, since the first and second shaft members and the ball member all have a relatively simple shape or construction, it becomes possible to provide these members inexpensively. Also, since the ball member is rotatably supported by the arc faces of the first and second shaft members through linear contact at four outer peripheral faces positioned on two cross lines perpendicularly crossing the center of the ball member, the torque transmission between the two shaft members may be carried out smoothly even with a rather large tolerance, and this universal joint is sufficiently applicable to hard-duty under a high torque condition since there are no punching, calking and assembly in the ball member and in the yoke members.

In addition, the shaft members are respectively constituted by the combination of the two separate half-elements, the shaft members may be readily mass-produced by any conventional means such as casting, pressing or the like.

Other features and advantages of the universal joint related to the present invention will become more apparent from the following description of preferred embodiments with reference to the accompanying drawings.

BRIEF DESCRIPTION OF THE DRAWINGS

FIG. 7 is an exploded side view showing the first or a second shaft member, FIGS. 8, 9 and 10 are cross sectional views respectively showing various connecting means for half-elements.

DETAILED DESCRIPTION OF THE PREFERRED EMBODIMENTS

A universal joint related to the present invention will now be particularly described with reference to the accompanying drawings.

Figure 1:
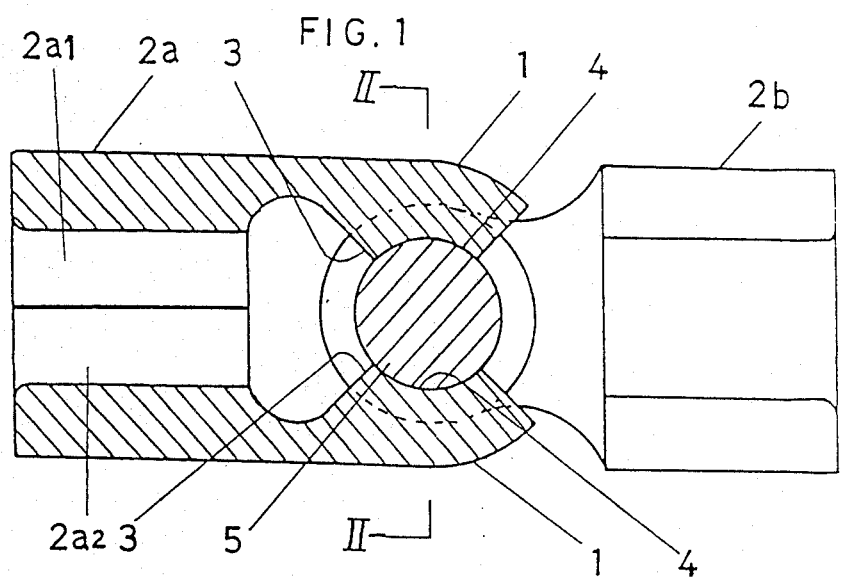
FIG. 1 is a cross sectional view showing a universal joint according to one preferred embodiment of the present invention.

Referring to FIG. 1, the universal joint related to the present invention comprises a first shaft member 2a and a second shaft member 2b respectively having a pair of yoke portions 1, 1, base seats 3, 3 respectively having a truncated cone shape and formed in mutually opposing faces of the yoke portions 1, 1, arc faces 4, 4 respectively formed in mutually opposing faces of the base seats 3, 3 and a ball member 5 rotatably supported in between the arc faces 4, 4.

Figure 3:
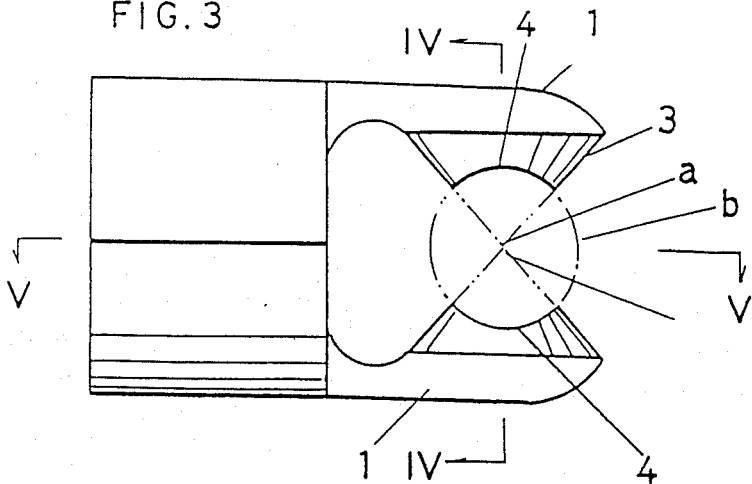
FIG. 3 is a side view showing a first shaft member of the universal joint shown in FIG. 1.
Figure 4:
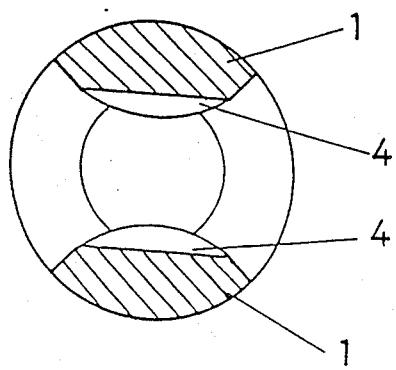
FIG. 4 is a cross sectional view taken along a line IV—IV of FIG. 3.
Figure 5:
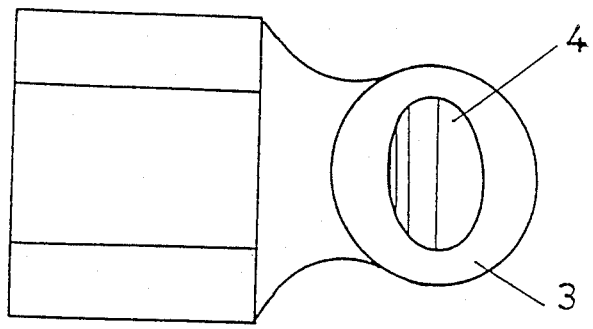
FIG. 5 is a cross sectional view taken along a line V—V of FIG. 3, FIGS. 6a and 6b are a plane view illustrating assembly processes of the universal joint related to the present invention.
Figure 11:
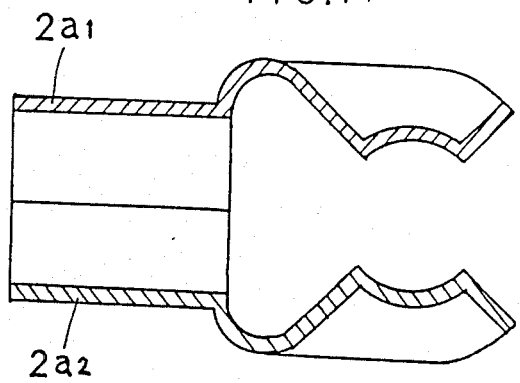
FIG. 11 is a longitudinal cross section showing pressed half-elements.

The truncated-cone-shaped base seats 3, 3, as shown in FIG. 3, are formed such that each virtual cone has a virtual vertex 'a', 'a' having an angle of substantially 90 degrees and at the same time the virtual vertexes 'a', 'a' of the cones are substantially in contact with each other.

Further, the pair of arc faces 4, 4 formed on the upper surface of the respective base seats 3, 3 have a central axis in a direction substantially perpendicular to the shaft members 2a, 2b and is formed partially along a peripheral face of a virtual cylinder 'b' having the same diameter as the ball member 5.

Figure 2:
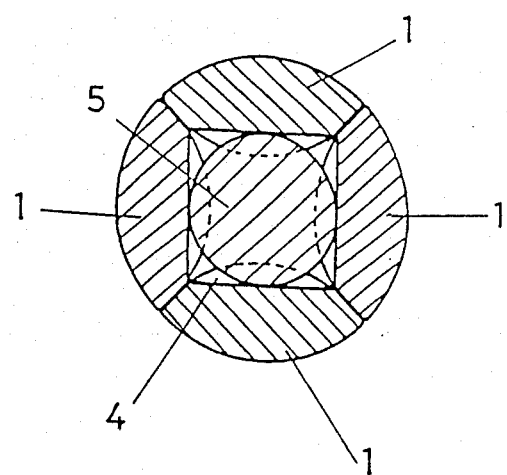
FIG. 2 is a cross sectional view taken along line II—II of FIG. 1.

Assembly of the universal joint having the above construction will be described next with reference to FIG. 6. After the ball member 5 is inserted in between the arc faces 4, 4 of the yoke portions of the first shaft member 2a, the second shaft member 2b is slid laterally with its axis being oriented perpendicular to the first shaft member 2b and the arc faces 4, 4 of the second shaft member 2b are fitted on the ball member 5. Then, the shaft members 2a, 2b are stretched to form a straight line. As the result, the ball member 5 is rotatably supported by the arc faces 4, 4 of the first shaft member 2a and the arc faces 4, 4 of the second shaft member 2b through linear contact at four outer peripheral faces positioned on two cross lines perpendicularly crossing the center of the ball member 5. Also, because of the ball member 5 disposed therebetween, the first and second shaft members 2a, 2b do not separate from each other. When these shaft member 2a, 2b are straightly interconnected, as shown in FIG. 2, since the inclined side faces of the truncated-cone shaped base seats 3, 3 of the shaft members 2a, 2b are in linear contact with each other, the interconnected shaft members 2a, 2b are prevented from being displaced in the direction perpendicular to the axes thereof, whereby the torque may be transmitted reliably.

Referring now to FIG. 7, the respective shaft members 2a, 2b are constituted by two separate half-elements $2a_1$ and $2a_2$ togetherwith forming the respective yoke portions 1, 1. The respective half-elements $2a_1$, $2a2 \geq$ may be integrally connected with each other by means of welding means 15 as shown in FIG. 8, or by means of fixing means such as bolts 6 as shown in FIG. 9, or further may be connected with each other by surrounding the elements by an outer collar 16 as shown in FIG. 10. A reference numeral 15 in FIG. 8 denotes buildup portions formed by the welding.

Figure 12:
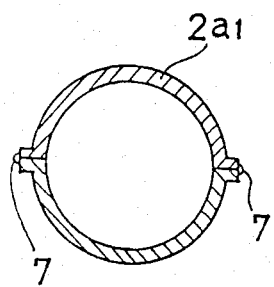
FIGS. 12 through 16 are cross sectional views respectively showing various connecting means for the pressed half-elements shown in FIG. 11.
Figure 14:
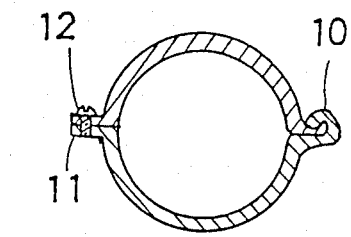
Figure 13:
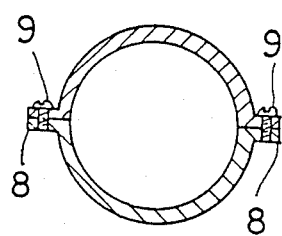
Figure 15:
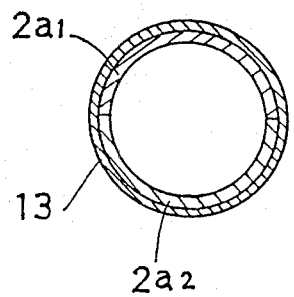
Figure 16:
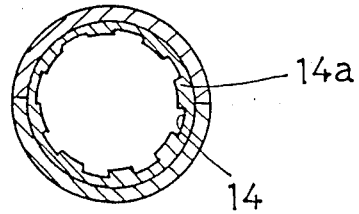

As being constituted by the combination of the half-elements $2a_1$ and $2a_2$, the shaft members 2a, 2b may be readily manufactured by casting or the like. Furthermore, since the shaft members 2a, 2b are identical to each other, mass production of the same is further facilitated. If the shaft members are to be used under a low torque situation, the elements may be mass-produced at an extremely low cost e.g. by pressing a sheet metal. In this case, greater variety of means may be used for interconnecting the half-elements $2a_1$ and $2a_2$. For example, as shown in FIG. 12, it is possible to provide projecting portions 7, 7 at edges of the half-elements $2a_1$, $2a_2$ and then the half elements $2a_1$ and $2a_2$ may be interconnected by welding these projecting portions 7, 7. Or, in FIG. 13, projecting portions 8, 8 are secured with each other by means of bolts 9, 9. Further, in FIG. 14, one-side edge of the elements is connected through a calking and the other-side edge is connected by a bolt 12. Needless to say, both edges may be connected through calkings. In FIG. 15, the half-elements $2a_1$ and $2a_2$ are interconnected by being surrounded by an outer collar 13. Further, in an arrangement shown in FIG. 16, the half-elements are placed with one overlying the other on an outer peripheral face of an inner collar 14 defining in an inner peripheral face thereof spline grooves 14a, with the elements being connected by means of welding. This arrangement of FIG. 16 is convenient in that the half-elements may be connected through these spline grooves 14a to an outer spline shaft (not shown).

Figure 17:
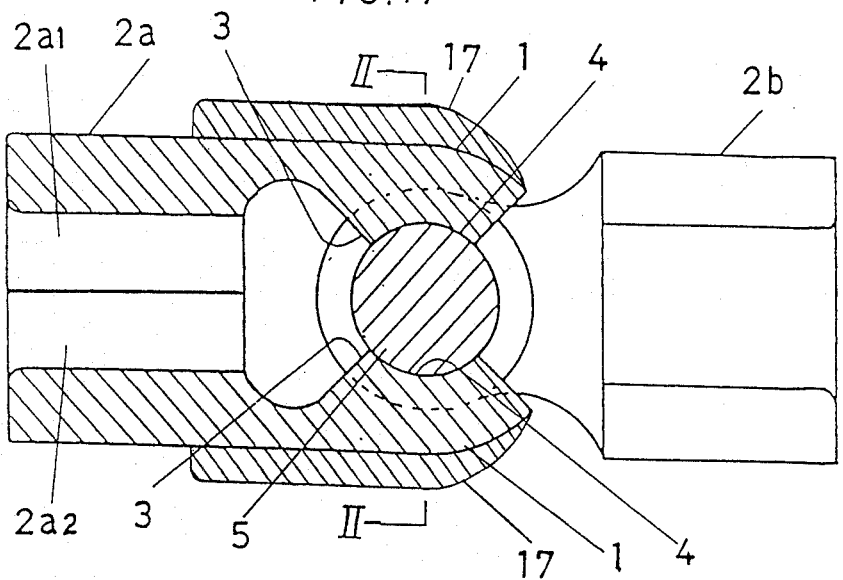
FIG. 17 is a longitudinal cross sectional view showing a universal joint according to another preferred embodiment of the present invention.
Figure 18:
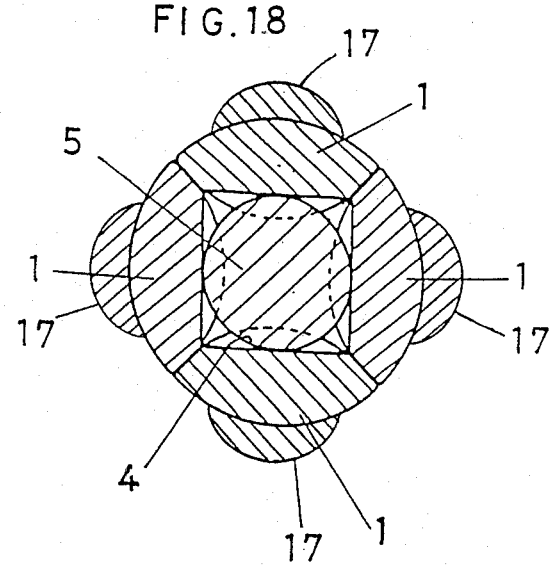
FIG. 18 is a cross sectional view taken along a line II—II of FIG. 17.

Moreover, as shown in FIGS. 17 and 18, it is also possible to provide ribs 17 axially of the shaft members 2a, 2b on the outer surfaces of the respective yoke portions 1, 1 of the shaft members 2a, 2b. These ribs 17 are formed extending from leading edges of the respective yoke portions 1, 1 to the vicinity of bases of the same. These ribs 17, 17 serve to reinforce the neck portions of the bases of the respective yoke portions 1, 1 thereby contributing to the overall reinforcement of the universal joint. In this case, the shape of the ribs 17 may be conveniently modified depending on an intended use of the universal joint.

What is claimed is:

1. A universal joint, comprising:
   first and second shaft members respectively including a pair of yoke portions on one end thereof;
   axially aligned ribs formed on an outer peripheral surface of each of said pair of yoke portions of said first and second shaft members, said ribs reinforcing thin roots of said yoke portions; and
   a ball member disposed between said first and second shaft members to movably interconnect the same; wherein
   said respective first and second shaft members are constituted by two separate half-elements which form the respective pair of yoke portions,
   base seats respectively having a truncated cone shape are provided in mutually opposing faces of said yoke portions such that each virtual cone has a virtual vertex having an angle of substantially 90 degrees and at the same time the virtual virtexes of the cones are substantially in contact with each other,
   said base seats respectively define arc faces in mutually opposing surfaces thereof, and
   said arc faces respectively have a central axis in a direction transverse to said shaft members and are formed by a part of a peripheral face of a virtual cylinder having the same diameter as said ball member which is rotatably supported between said arc faces.

2. A universal joint, as defined in claim 1, wherein said ribs are formed so as to extend from leading edges of said first and second shaft members to a vicinity of bases of the respective yoke portions of the same.

3. A universal joint, as defined in claim 2, wherein said first shaft member and said second shaft member are substantially identical to each other.

4. A universal joint, as defined in claim 1, wherein said first shaft member and said second shaft member are substantially identical to each other.

* * * * *